US012562388B2

(12) United States Patent
Yim et al.

(10) Patent No.: US 12,562,388 B2
(45) Date of Patent: Feb. 24, 2026

(54) CATHODE SLURRY FOR LITHIUM SECONDARY BATTERY, PREPARATION METHOD OF CATHODE FOR LITHIUM SECONDARY BATTERY, CATHODE FOR LITHIUM SECONDARY BATTERY, AND LITHIUM SECONDARY BATTERY INCLUDING THE SAME

(71) Applicant: SK ON CO., LTD., Seoul (KR)

(72) Inventors: Hyung Joo Yim, Daejeon (KR); Min Hwan Kim, Daejeon (KR); Jae Youn Kim, Daejeon (KR); Sung Jun Park, Daejeon (KR); Jung Min Yang, Daejeon (KR); Byoung Wook Jo, Daejeon (KR)

(73) Assignee: SK ON CO., LTD., Seoul (KR)

( * ) Notice: Subject to any disclaimer, the term of this patent is extended or adjusted under 35 U.S.C. 154(b) by 536 days.

(21) Appl. No.: 18/096,024

(22) Filed: Jan. 12, 2023

(65) Prior Publication Data

US 2023/0223544 A1 Jul. 13, 2023

(30) Foreign Application Priority Data

Jan. 13, 2022 (KR) ........................ 10-2022-0005119

(51) Int. Cl.

| | |
|---|---|
| ***H01M 4/62*** | (2006.01) |
| ***H01M 4/02*** | (2006.01) |
| ***H01M 4/04*** | (2006.01) |
| ***H01M 4/131*** | (2010.01) |
| ***H01M 4/1391*** | (2010.01) |

(Continued)

(52) U.S. Cl.

CPC ......... *H01M 4/628* (2013.01); *H01M 4/0404* (2013.01); *H01M 4/131* (2013.01); *H01M 4/1391* (2013.01); *H01M 4/505* (2013.01); *H01M 4/525* (2013.01); *H01M 4/623* (2013.01);

(Continued)

(58) Field of Classification Search

CPC .... H01M 4/628; H01M 4/0404; H01M 4/131; H01M 4/1391; H01M 4/623; H01M 4/505; H01M 4/525

See application file for complete search history.

(56) References Cited

U.S. PATENT DOCUMENTS

2020/0350577 A1 11/2020 Uematsu

FOREIGN PATENT DOCUMENTS

CN 101640262 A 2/2010
EP 3432387 81 3/2021

(Continued)

OTHER PUBLICATIONS

Office Action for the Korean Patent Application No. 10-2022-0005119 issued by the Korean Intellectual Property Office on Apr. 17, 2023.

(Continued)

*Primary Examiner* — Sarah A. Slifka
(74) *Attorney, Agent, or Firm* — IP & T GROUP LLP

(57) ABSTRACT

A cathode slurry for a lithium secondary battery according to exemplary embodiments may include a cathode active material including lithium metal oxide particles, a binder, a dispersion medium, and at least one of a multivalent carboxylic acid compound and a salt of the multivalent carboxylic acid compound. A total amount of the multivalent carboxylic acid compound and the salt of the multivalent carboxylic acid compound in the cathode slurry may be 0.01 to 0.05 wt. parts based on 100 wt. parts of the lithium metal oxide particles.

13 Claims, 2 Drawing Sheets

(51) Int. Cl.
*H01M 4/505* (2010.01)
*H01M 4/525* (2010.01)
*H01M 10/052* (2010.01)

(52) U.S. Cl.
CPC .... *H01M 10/052* (2013.01); *H01M 2004/028* (2013.01)

(56) References Cited

FOREIGN PATENT DOCUMENTS

| | | | |
|---|---|---|---|
| JP | 2002-170569 | A | 6/2002 |
| JP | 2016-038962 | A | 3/2016 |
| JP | 2017-073275 | A | 4/2017 |
| JP | WO2019/168035 | A1 | 9/2019 |
| KR | 10-2003-0057225 | A | 7/2003 |
| KR | 10-2006-0092553 | A | 8/2006 |
| KR | 10-1355288 | B1 | 1/2014 |
| KR | 10-2015-0080394 | A | 7/2015 |
| WO | 2021/045025 | A1 | 3/2021 |

OTHER PUBLICATIONS

EESR issued by the EPO for Application No. 23151211.2, dated Jul. 13, 2023.

[FIG. 1]
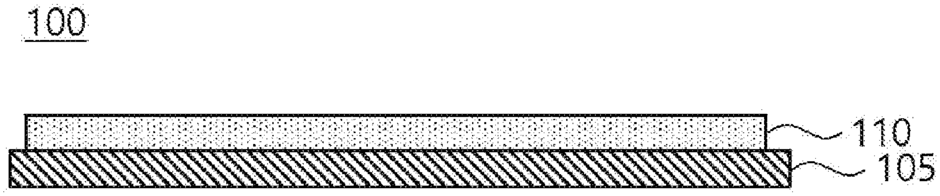
[FIG. 2]
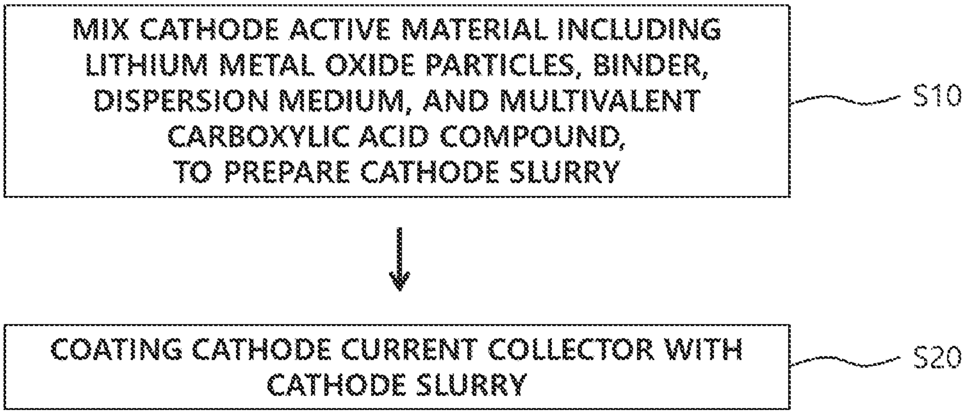

[FIG. 3]
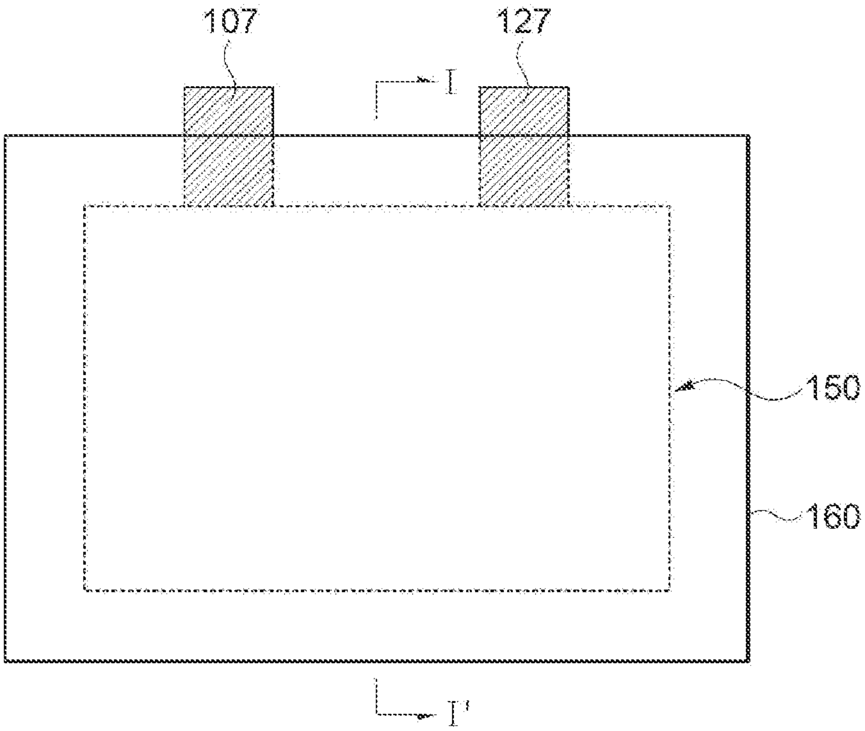
[FIG. 4]
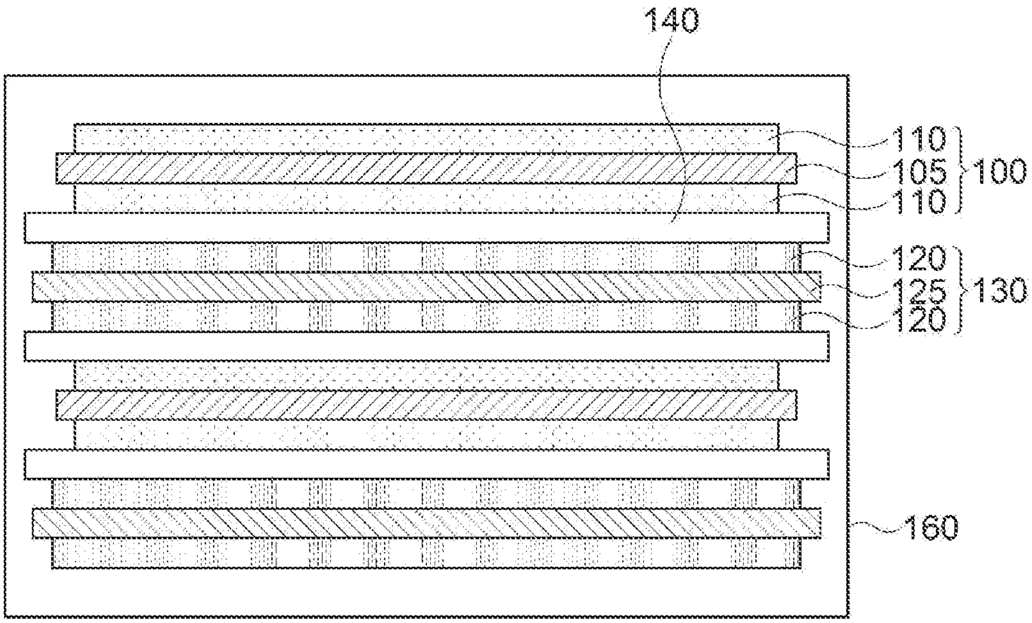

CATHODE SLURRY FOR LITHIUM SECONDARY BATTERY, PREPARATION METHOD OF CATHODE FOR LITHIUM SECONDARY BATTERY, CATHODE FOR LITHIUM SECONDARY BATTERY, AND LITHIUM SECONDARY BATTERY INCLUDING THE SAME

BACKGROUND OF THE INVENTION

1. Field of the Invention

The present invention relates to a cathode slurry for a lithium secondary battery, a preparation method of a cathode for a lithium secondary battery, a cathode for a lithium secondary battery, and a lithium secondary battery including the same.

2. Description of the Related Art

A secondary battery is a battery which can be repeatedly charged and discharged, and has been widely applied to portable electronic devices such as a mobile phone, a laptop computer, etc. or electric vehicles as a power source thereof.

A lithium secondary battery has a high operating voltage and a high energy density per unit weight, and is advantageous in terms of a charging speed and light weight. In this regard, the lithium secondary battery has been actively developed and applied as a power source.

For example, the lithium secondary battery may include: an electrode assembly including a cathode, an anode, and a separation membrane interposed between the cathode and the anode; and an electrolyte in which the electrode assembly is impregnated in a case.

For example, the cathode may be prepared by coating (e.g., applying, drying and rolling) a cathode slurry, in which a cathode active material (e.g., lithium metal oxide particles), a binder and a conductive material are dispersed in a dispersion medium, on a cathode current collector.

For example, crosslinking of the binder and gelation of the cathode slurry may be progressed by an alkaline component (e.g., Li+). In this case, it is difficult to uniformly coat the cathode current collector with the cathode slurry, and phase stability of the cathode active material layer may be reduced.

For example, in order to prevent gelation of the cathode slurry, a method of adjusting an alkali component by adding an acid to the cathode slurry has been proposed. For example, KR 10-0657951 discloses a method of suppressing gelation by adding 1 to 30 parts by weight ("wt. parts") of an acid based on 100 wt. parts of a cathode active material.

However, the above-described method has a problem in that prevention of the gelation phenomenon is insufficient, a large amount of the dispersion medium remains in the cathode active material layer after drying, and thereby causing a degradation in life-span characteristics of the battery. In addition, there is a problem such as an increase in an internal resistance of the secondary battery.

SUMMARY OF THE INVENTION

An object of the present invention is to provide a cathode slurry for a lithium secondary battery, in which crosslinking and gelation of a binder are prevented.

In addition, another object of the present invention is to provide a cathode for a lithium secondary battery, which includes a cathode active material layer having improved coating properties and phase stability, and a preparation method thereof.

Further, another object of the present invention is to provide a lithium secondary battery including the same, which has a low internal resistance and improved life-span characteristics.

To achieve the above objects, according to an aspect of the present invention, there is provided a cathode slurry for a lithium secondary battery including: a cathode active material including lithium metal oxide particles; a binder; a dispersion medium; and at least one of a multivalent carboxylic acid compound and a salt of the multivalent carboxylic acid compound; wherein a total content of the multivalent carboxylic acid compound and the salt of the multivalent carboxylic acid compound is 0.01 to 0.05 parts by weight based on 100 parts by weight of the lithium metal oxide particles.

In one embodiment, the multivalent carboxylic acid compound may include 2 to 5 carboxyl groups.

In one embodiment, the number of carbon atoms of the multivalent carboxylic acid compound may be 3 to 20.

In one embodiment, the multivalent carboxylic acid compound may be represented by Formula 1 below:

[Formula 1]

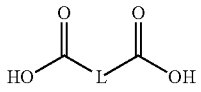

(In Formula 1, L may represent a substituted or unsubstituted C1-C10 alkylene group, or a substituted or unsubstituted C2-C10 alkenylene group).

In one embodiment, the lithium metal oxide particles may contain 80 mol % or more of nickel based on the total number of moles of all elements except for lithium and oxygen.

In one embodiment, the binder may include a fluorine binder resin.

In one embodiment, a weight ratio of the fluorine binder resin to a total weight of the multivalent carboxylic acid compound and the salt of the multivalent carboxylic acid compound in the cathode slurry may be 20 to 200.

In one embodiment, the dispersion medium may include a polar organic solvent.

In one embodiment, a content of the dispersion medium may be 15 to 30% by weight based on a total weight of the cathode slurry.

In addition, according to an aspect of the present invention, there is provided a method of preparing a cathode for a lithium secondary battery including: mixing a cathode active material including lithium metal oxide particles, a binder, a dispersion medium, and a multivalent carboxylic acid compound, to prepare a cathode slurry; and coating a cathode current collector with the cathode slurry, to form a cathode active material layer, wherein the step of preparing the cathode slurry includes mixing the lithium metal oxide particles and the multivalent carboxylic acid compound in a weight ratio of 100:0.01 to 100:0.05.

In one embodiment, the lithium metal oxide particles may contain 80 mol % or more of nickel based on the total number of moles of all elements except for lithium and oxygen.

In one embodiment, in the step of preparing the cathode slurry, the multivalent carboxylic acid compound may be converted into a salt of the multivalent carboxylic acid compound.

In one embodiment, the step of forming the cathode active material layer may include drying the cathode active material layer so as to remove at least a portion of the dispersion medium, and in the step of drying the cathode active material layer, an amount of the dispersion medium remaining in the cathode active material layer is adjusted to less than 400 ppm based on a total weight of the cathode active material layer.

Further, according to an aspect of the present invention, there is provided a cathode for a lithium secondary battery including: a cathode current collector; and a cathode active material layer formed on the cathode current collector, wherein the cathode active material layer may include: a cathode active material including lithium metal oxide particles; a binder; and at least one of a multivalent carboxylic acid compound and a salt of the multivalent carboxylic acid compound, wherein a total content of the multivalent carboxylic acid compound and the salt of the multivalent carboxylic acid compound in the cathode active material layer is 0.01 to 0.05 parts by weight based on 100 parts by weight of the lithium metal oxide particles.

In one embodiment, the cathode active material layer may be formed from a cathode slurry including the cathode active material, the binder, at least one of the multivalent carboxylic acid compound and the salt of the multivalent carboxylic acid compound, and a dispersion medium.

In one embodiment, an amount of the dispersion medium remaining in the cathode active material layer may be less than 400 ppm based on a total weight of the cathode active material layer.

Furthermore, according to an aspect of the present invention, there is provided a lithium secondary battery including: the cathode for a lithium secondary battery according to the exemplary embodiments; and an anode disposed to face the cathode.

The cathode slurry for a lithium secondary battery according to exemplary embodiments includes a predetermined content of a multivalent carboxylic acid compound, such that gelation over time may be prevented, and thereby having improved coating properties.

In the method of preparing a cathode for a lithium secondary battery according to exemplary embodiments, by using the cathode slurry, it is possible to provide a cathode for a lithium secondary battery including a cathode active material layer having improved phase stability. An amount of the dispersion medium remaining in the cathode active material layer may be small.

The lithium secondary battery according to exemplary embodiments may have a low internal resistance and improved life-span characteristics due to the cathode included therein.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a schematic cross-sectional view illustrating a cathode for a lithium secondary battery according to exemplary embodiments;

FIG. 2 is a schematic flowchart illustrating a method of preparing a cathode for a lithium secondary battery according to exemplary embodiments; and FIGS. 3 and 4 are a schematic plan view and a cross-sectional view illustrating a lithium secondary battery according to exemplary embodiments, respectively.

DETAILED DESCRIPTION OF THE INVENTION

According to exemplary embodiments of the present invention, there is provided a cathode slurry for a lithium secondary battery, which includes a multivalent carboxylic acid compound in a predetermined content.

In addition, there are provided a cathode for a lithium secondary battery, which includes a cathode active material layer formed from the cathode slurry and a preparation method thereof.

Further, there is provided a lithium secondary battery including the cathode.

Cathode Slurry for Lithium Secondary Battery

The cathode slurry according to exemplary embodiments may include a cathode active material including lithium metal oxide particles; a binder; a dispersion medium; and at least one of a multivalent carboxylic acid compound and a salt of the multivalent carboxylic acid compound.

For example, residual lithium (e.g., lithium impurities such as LiOH) present in the lithium metal oxide particles may form a base component due to moisture during preparing the cathode slurry. For example, cross-linking of the binder and gelation of the cathode slurry may be progressed over time due to the base component. Thereby, a coating performance of the cathode slurry may be reduced such that the cathode active material layer cannot be uniformly formed, and the phase stability of the cathode active material layer may be reduced.

For example, the multivalent carboxylic acid compound may neutralize the base component in the cathode slurry and may be converted into a salt of the multivalent carboxylic acid compound (e.g., a lithium salt). Thereby, the cathode slurry may include both the multivalent carboxylic acid compound and a salt thereof, or may include only the salt of the multivalent carboxylic acid compound.

In exemplary embodiments of the present invention, a total content of the multivalent carboxylic acid compound and the salt thereof in the cathode slurry may be 0.01 to 0.05 wt. parts based on 100 wt. parts of the lithium metal oxide particles.

Within the above range, crosslinking of the binder and gelation of the cathode slurry may be further inhibited, thus to form a cathode active material layer having improved phase stability. In addition, within the above range, an amount of the dispersion medium (e.g., polar organic solvent, NMP, etc.) remaining in the cathode active material layer may be further reduced. Accordingly, an internal resistance of the lithium secondary battery may be reduced, and life-span characteristics of the lithium secondary battery may be improved.

If the total content of the multivalent carboxylic acid compound and the salt thereof is less than 0.01 wt. parts based on 100 wt. parts of the lithium metal oxide particles, a large amount of base components may remain in the cathode slurry without being sufficiently removed. Thereby, suppression of crosslinking of the binder and gelation of the cathode slurry may be insufficient.

If the total content of the multivalent carboxylic acid compound and the salt thereof exceeds 0.05 wt. parts based on 100 wt. parts of the lithium metal oxide particles, surfaces of the lithium metal oxide particles are modified by the multivalent carboxylic acid compound (or the salt thereof), such that aggregation and bonding between the lithium metal oxide particles may be increased. Accordingly, a large amount of the dispersion medium may be captured in the cathode active material layer, thereby remaining therein in a large amount. In this case, the internal resistance of the lithium secondary battery may be increased, and the life-span characteristics of the lithium secondary battery may be reduced.

In one embodiment, the multivalent carboxylic acid compound may include 2 to 5, 2 to 4, or 2 to 3 carboxyl groups.

In one embodiment, the number of carbon atoms of the multivalent carboxylic acid compound may be 3 to 20, 3 to 10, or 3 to 6.

In one embodiment, the multivalent carboxylic acid compound may be represented by Formula 1 below.

[Formula 1]

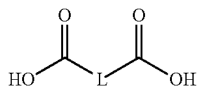

For example, in Formula 1, L may represent a substituted or unsubstituted C1-C10 alkylene group or a substituted or unsubstituted C2-C10 alkenylene group.

For example, the meaning of "substituted" may mean that a hydrogen atom is substituted with an optional substituent, such that the optional substituent is further bonded to the corresponding substituent.

For example, the optional substituent may be a halogeno group, a C1-C6 alkyl group, a C2-C6 alkenyl group, a C3-C7 cycloalkyl group, 5- to 7-membered heterocycloalkyl group, a hydroxyl group, $—NR_1R_2$ ($R_1$ and $R_2$ are each independently hydrogen or C1-C3 alkyl group), a nitro group ($—NO_2$), a cyano group (—CN), a thiocyanate group (—SCN), an isothiocyanate group (—NCS), a C1-C6 alkoxy group, a carbonyl group and the like.

In some embodiments, the optional substituent may be a C1-C6 alkyl group or a C2-C6 alkenyl group.

In some embodiments, L may represent an unsubstituted C1-C6 alkylene group or an unsubstituted C2-C6 alkenylene group. In this case, the above-described effects may be further improved.

In some embodiments, the multivalent carboxylic acid compound may include at least one of succinic acid, maleic acid and malonic acid. In this case, the above-described effects may be further improved.

In one embodiment, the lithium metal oxide particles may include 80 mol % or more (high-nickel), 83 mole or more, 85 mole or more, 88 mole or more, or 90 mol % of nickel based on the total number of moles of all elements except for lithium and oxygen. Within the above range, it is possible to provide a secondary battery having more improved capacity.

Meanwhile, the surfaces of the high-nickel lithium metal oxide particles are easily modified by the multivalent carboxylic acid compound (or the salt thereof), such that aggregation and bonding between the lithium metal oxide particles may be increased. Accordingly, a large amount of the dispersion medium may be captured in the cathode active material layer, thereby remaining therein in a large amount. In addition, the high-nickel lithium metal oxide particles may include a larger amount of residual lithium than LCO, LMO, low-nickel lithium metal oxide particles (less than 80 mol % of nickel), etc., and thereby, crosslinking of the binder and gelation of the cathode slurry may be intensified.

However, even when the cathode slurry according to exemplary embodiments of the present invention includes the high-nickel lithium metal oxide particles, since it includes the multivalent carboxylic acid compound in the above content range, crosslinking of the binder and gelation of the cathode slurry may be effectively suppressed and a large amount of the dispersion medium may be prevented from remaining in the cathode active material layer.

In one embodiment, the lithium metal oxide particle may be represented by Formula 2 below.

$Li_xNi_{(1-a-b)}Co_aM_bO_y$ [Formula 2]

For example, in Formula 2, M may be at least one of Al, Zr, Ti, Cr, B, Mg, Mn, Ba, Si, Y, W, and Sr, and x, y, a, b and c may be in a range of $0.9 \le x \le 1.2$, $1.9 \le y \le 2.1$ and $0 \le a+b \le 0.5$, respectively.

In some embodiments, in Formula 2, a sum of a and b (a+b) may satisfy $0<a+b \le 0.4$, $0<a+b \le 0.3$, $0<a+b \le 0.2$, $0<a+b \le 0.17$, $0<a+b \le 0.15$, $0<a+b \le 0.12$ or $0<a+b \le 0.1$.

For example, a binder known in the art as a cathode binder may be employed as the binder.

In one embodiment, the binder may include a fluorine binder resin.

In some embodiments, the fluorine binder resin may include a fluorine-substituted hydrocarbon resin. For example, the fluorine-substituted hydrocarbon resin may include polyvinylidene fluoride (PVDF), vinylidene fluoride-hexafluoropropylene copolymer (PVDF-co-HFP) and the like.

Meanwhile, the fluorine binder resin may be subjected to dehydrofluorination by a base component in the cathode slurry. Thereby, when using a fluorine binder resin, crosslinking of the binder and gelation of the cathode slurry may be further accelerated.

In some embodiments, a ratio of a weight of the fluorine binder resin to a total weight of the multivalent carboxylic acid compound and the salt of the multivalent carboxylic acid compound in the cathode slurry may be 20 to 500, and preferably 20 to 200. When the fluorine-based binder is included in the above range, crosslinking of the fluorine-based binder and gelation of the cathode slurry may be further suppressed.

In one embodiment, the dispersion medium may include a polar organic solvent (e.g., N-methyl-2-pyrrolidinone (NMP), etc.).

In some embodiments, a content of the dispersion medium may be 15 to 30% by weight ("wt. %") of a total weight of the cathode slurry.

In some embodiments, a solid content of the cathode slurry may be 70 to 85 wt. %.

In one embodiment, the cathode slurry may further include a conductive material. For example, the conductive material may include a carbon-based conductive material such as graphite, carbon black, graphene, and carbon nanotubes; a metal-based conductive material including tin, tin oxide, titanium oxide, or a perovskite material such as $LaSrCoO_3$, and $LaSrMnO_3$.

Cathode for Lithium Secondary Battery and Preparation Method Thereof

FIG. 1 is a schematic cross-sectional view illustrating a cathode for a lithium secondary battery according to exemplary embodiments, and FIG. 2 is a flowchart schematically illustrating a method of preparing a cathode for a lithium secondary battery according to exemplary embodiments.

Referring to FIG. 1, a cathode 100 for a lithium secondary battery may include a cathode current collector 105 and a cathode active material layer 110 formed on the cathode current collector 105. The cathode active material layer(s) 110 may be formed on one side or both sides of the cathode current collector 105.

Referring to FIG. 2, a cathode slurry may be prepared by mixing a cathode active material including lithium metal oxide particles, a binder, a multivalent carboxylic acid compound in a dispersion medium (e.g., S10).

For example, the above-described cathode slurry according to the exemplary embodiments of the present invention may be prepared by step S10. The above detailed description may be applied to the lithium metal oxide particles, the multivalent carboxylic acid compound and the dispersion medium as it is.

According to exemplary embodiments of the present invention, step S10 may include mixing the lithium metal oxide particles and the multivalent carboxylic acid compound in a weight ratio of 100:0.01 to 100:0.05.

Within the above range, crosslinking of the binder and gelation of the cathode slurry may be further suppressed. Thereby, phase stability of the cathode active material layer may be improved. In addition, the amount of the dispersion medium (e.g., polar organic solvent, NMP, etc.) remaining in the cathode active material layer may be reduced. Accordingly, the internal resistance of the lithium secondary battery may be reduced, and the life-span characteristics of the lithium secondary battery may be improved.

If the weight ratio is less than 100:0.01, a large amount of the base component may remain in the cathode slurry without being sufficiently removed. Accordingly, suppression of crosslinking of the binder and gelation of the cathode slurry may be insufficient.

If the weight ratio exceeds 100:0.05, the surfaces of the lithium metal oxide particles are modified by the multivalent carboxylic acid compound, such that aggregation and bonding between the lithium metal oxide particles may be increased. Thereby, a large amount of the dispersion medium may remain in the cathode active material layer, the internal resistance of the lithium secondary battery may be increased, and life-span characteristics of the lithium secondary battery may be reduced.

In one embodiment, the binder may include a fluorine binder resin.

In some embodiments, in step S10, the fluorine binder resin and the multivalent carboxylic acid compound may be mixed in a weight ratio of 100:0.2 to 100:5, and preferably 100:0.5 to 100:5. Within the above range, crosslinking of the fluorine binder resin and gelation of the cathode slurry may be further suppressed.

For example, in step S10, the multivalent carboxylic acid compound may be converted into a salt (e.g., lithium salt) of the multivalent carboxylic acid compound.

In some embodiments, only the salt of the multivalent carboxylic acid compound may remain in the cathode active material layer 110. For example, all of the multivalent carboxylic acid compounds may be converted into salts of the multivalent carboxylic acid compounds.

The cathode active material layer 110 may be formed on the cathode current collector 105 by coating the cathode current collector 105 with the cathode slurry (e.g., S20).

In one embodiment, step S20 may include drying the cathode active material layer 110. In some embodiments, step S20 may include applying the cathode slurry to the cathode current collector 105, followed by drying and rolling the same.

For example, at least a portion of the dispersion medium present in the cathode active material layer 110 may be removed by the drying.

The cathode active material layer 110 may include a cathode active material including the lithium metal oxide particles, the binder, and at least one of the multivalent carboxylic acid compound and the salt of the multivalent carboxylic acid compound. The above detailed description may be applied to the lithium metal oxide particles, the multivalent carboxylic acid compound and the dispersion medium as it is.

According to exemplary embodiments of the present invention, the total content of the multivalent carboxylic acid compound and the salt of the multivalent carboxylic acid compound in the cathode active material layer 110 may be 0.01 to 0.05 wt. parts based on 100 wt. parts of the lithium metal oxide particles.

In one embodiment, the total content of the multivalent carboxylic acid compound and the salt of the multivalent carboxylic acid compound in the cathode active material layer 110 may be 0.008 to 0.04 wt. parts based on 100 wt. parts of the lithium metal oxide particles. Within the above range, phase stability of the cathode active material layer 110 may be further improved.

In one embodiment, the amount of the dispersion medium remaining in the cathode active material layer 110 is less than 400 ppm, preferably less than 300 ppm, more preferably less than 200 ppm, and even more preferably less than 100 ppm based on the total weight of the cathode active material layer 110. Within the above range, the internal resistance of the lithium secondary battery may be further reduced, and the life-span characteristics of the lithium secondary battery may be further improved.

Lithium Secondary Battery

FIGS. 3 and 4 are a schematic plan view and a cross-sectional view illustrating a lithium secondary battery according to exemplary embodiments, respectively. FIG. 4 is a cross-sectional view taken on line I-I' in FIG. 3.

Referring to FIGS. 3 and 4, the lithium secondary battery may include the above-described cathode 100 according to the exemplary embodiments of the present invention, and an anode 130 disposed to face the cathode 100.

For example, the anode 130 may include an anode current collector 125 and an anode active material layer 120 formed on the anode current collector 125.

For example, the anode active material layer 120 may include an anode active material, and if necessary, an anode binder and a conductive material.

For example, the anode 130 may be prepared by preparing an anode slurry including an anode active material, an anode binder, a dispersion medium, and if necessary, a conductive material, and then applying the prepared anode slurry to the anode current collector 125, followed by drying and rolling the same.

For example, the anode current collector 125 may include gold, stainless steel, nickel, aluminum, titanium, copper or an alloy thereof, and preferably, includes copper or a copper alloy.

For example, the anode active material may be a material capable of intercalating and deintercalating lithium ions. For example, the anode active material may include a lithium alloy, a carbon-based active material, a silicon-based active material and the like.

For example, the lithium alloy may include aluminum, zinc, bismuth, cadmium, antimony, silicon, lead, tin, gallium, indium and the like.

For example, the carbon-based active material may include crystalline carbon, amorphous carbon, carbon composite, carbon fiber and the like.

For example, the amorphous carbon may include hard carbon, cokes, mesocarbon microbead (MCMB) calcined at 1500° C. or lower, mesophase pitch-based carbon fiber (MPCF) or the like.

For example, the crystalline carbon may include natural graphite, artificial graphite, graphite cokes, graphite MCMB, graphite MPCF and the like.

In one embodiment, the anode active material may include a silicon-based active material. For example, the silicon-based active material may include Si, $SiO_x$ ($0<x<2$), Si/C, SiO/C, Si-metal and the like. In this case, a capacity of the secondary battery may be further enhanced.

In some embodiments, a content of silicon atoms in the anode active material may be 1 to 20 wt. %, 1 to 15 wt. %, or 1 to 10 wt. %.

For example, the anode binder may be an aqueous binder such as styrene-butadiene rubber (SBR). In addition, for example, the anode binder may be used together with a thickener such as carboxymethyl cellulose (CMC).

For example, the conductive material may include a carbon-based conductive material such as graphite, carbon black, graphene, and carbon nanotubes; or a metal-based conductive material including tin, tin oxide, titanium oxide, or a perovskite material such as $LaSrCoO_3$, and $LaSrMnO_3$.

For example, a separation membrane 140 may be interposed between the cathode 100 and the anode 130.

In some embodiments, the anode 130 may have an area greater than that of the cathode 100. In this case, lithium ions generated from the cathode 100 may smoothly move to the anode 130 without precipitation in the middle.

For example, the separation membrane 140 may include a porous polymer film made of a polyolefin polymer such as ethylene homopolymer, propylene homopolymer, ethylene/butene copolymer, ethylene/hexene copolymer, ethylene/methacrylate copolymer or the like. Alternatively, for example, the separation membrane 140 may include a non-woven fabric made of glass fiber having a high melting point, polyethylene terephthalate fiber or the like.

For example, an electrode cell may be formed including the cathode 100, the anode 130, and the separation membrane 140.

For example, a plurality of electrode cells may be laminated to form an electrode assembly 150. For example, the electrode assembly 150 may be formed by winding, lamination, z-folding, etc. the separation membrane 140.

The lithium secondary battery according to exemplary embodiments may include: a cathode lead 107 connected to the cathode 100 and protruding to an outside of a case 160; and an anode lead 127 connected to the anode 130 and protruding to the outside of the case 160.

For example, the cathode 100 and the cathode lead 107 may be electrically connected with each other. Similarly, the anode 130 and the anode lead 127 may be electrically connected with each other.

For example, the cathode lead 107 may be electrically connected to the cathode current collector 105. In addition, the anode lead 127 may be electrically connected to the anode current collector 125.

For example, the cathode current collector 105 may include a protrusion part (cathode tab, not illustrated) on one side. The cathode active material layer 110 may not be formed on the cathode tab. The cathode tab may be formed integrally with the cathode current collector 105 or may be connected thereto by welding or the like. The cathode current collector 105 and the cathode lead 107 may be electrically connected with each other through the cathode tab.

Similarly, the anode current collector 125 may include a protrusion part (anode tab, not illustrated) on one side. The anode active material layer 120 may not be formed on the anode tab. The anode tab may be formed integrally with the anode current collector 125 or may be connected thereto by welding or the like. The anode current collector 125 and the anode lead 127 may be electrically connected with each other through the anode tab.

In one embodiment, the electrode assembly 150 may include a plurality of cathodes and a plurality of anodes. For example, the plurality of cathodes and the plurality of anodes may be disposed alternately with each other, and the separation membranes may be interposed between the cathodes and the anodes. Accordingly, the lithium secondary battery according to an embodiment of the present invention may include a plurality of cathode tabs and a plurality of anode tabs protruding from each of the plurality of cathodes and the plurality of anodes.

In one embodiment, the cathode tabs (or, the anode tabs) may be laminated, compressed, and welded to form a cathode tab laminate (or, an anode tab laminate). The cathode tab laminate may be electrically connected to the cathode lead 107. In addition, the anode tab laminate may be electrically connected to the anode lead 127.

For example, the electrode assembly 150 may be housed in the case 160 together with an electrolyte to form a lithium secondary battery.

The lithium secondary battery may be manufactured, for example, in a cylindrical shape, a square shape, a pouch type or a coin shape.

The electrode assembly 150 may be housed in the case 160 together with the electrolyte to form the lithium secondary battery.

For example, the electrolyte may include a lithium salt, an organic solvent, and if necessary, an additive.

For example, the lithium salt may be represented by $Li^+X^-$.

For example, $X^-$ may be $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$ and the like.

For example, the lithium salt may include $LiBF_4$, $LiPF_6$ and the like.

For example, the organic solvent may include ethylene carbonate (EC), propylene carbonate (PC), dimethyl carbonate (DMC), diethyl carbonate (DEC), ethylmethyl carbonate (EMC), methylpropyl carbonate, dipropyl carbonate, dimethyl sulfoxide, acetonitrile, dimethoxyethane, diethoxyethane, vinylene carbonate, sulforane, γ-butyrolactone, propylene sulfite, tetrahydrofurane and the like.

For example, the additive may include a fluorine-containing carbonate compound, a vinylene carbonate compound, a fluorine-containing lithium phosphate compound, a sultone compound, a sulfate compound, a borate compound, a nitrile compound, an amine compound, a silane compound, a benzene compound and the like.

For example, the fluorine-containing carbonate compound may include fluoroethylene carbonate (FEC) and the like.

For example, the vinylene carbonate compound may include vinylene carbonate (VC), vinyl ethylene carbonate (VEC) and the like.

For example, the fluorine-containing lithium phosphate compound may include lithium difluorophosphate ($LiPO_2F_2$), lithium difluoro(bisoxalato) phosphate and the like.

For example, the sultone compound may include 1,3-propane sultone (PS), 1,4-butane sultone, ethensultone, 1,3-propene sultone (PRS), 1,4-butene sultone, 1-methyl-1,3-propene sultone and the like.

For example, the sulfate compound may include ethylene sulfate (ESA), trimethylene sulfate (TMS), methyltrimethylene sulfate (MTMS) and the like.

For example, the borate compound may include lithium tetraphenyl borate, lithium difluoro(oxalato)borate (LiODFB) and the like.

For example, the nitrile compound may include succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, 4-fluorophenylacetonitrile and the kike.

For example, the amine compound may include triethanolamine, ethylene diamine and the like.

For example, the silane compound may include tetravinyl silane and the like.

For example, the benzene compound may include monofluoro benzene, difluorobenzene, trifluoro benzene, tetrafluoro benzene and the like.

For example, the lithium secondary battery may be manufactured in a cylindrical shape, a square shape, a pouch shape or a coin shape.

Hereinafter, preferred examples and comparative examples of the present invention will be described. However, the following examples are only preferred examples of the present invention, and the present invention is not limited thereto.

Example 1

(1) Preparation of Cathode Slurry $Li(Ni_{0.8}Co_{0.1}Mn_{0.1})O_2$ as a cathode active material, carbon nanotube (CNT) as a conductive material, and polyvinylidene fluoride (PVDF) as a binder were dispersed in N-methyl-2-pyrrolidone (NMP) in a weight ratio of 98.2:0.6:1.2 to prepare a dispersion. The solid content in the dispersion was 74.5 wt. %.

0.01 wt. parts of maleic acid (MA) was input into the dispersion based on 100 wt. parts of the cathode active material, then the mixture was stirred to prepare a cathode slurry.

Evaluation 1: Measurement of Change in Viscosity of Cathode Slurry Over Time

An initial viscosity V1 of the cathode slurry was measured according to the following method.

A viscosity of the cathode slurry was measured using a rotational rheometer at 10 points at a shear rate with a logarithmic equal interval from a shear rate of 0.1 $s^{-1}$ to 100 $s^{-1}$, among which a viscosity at a shear rate of 4.642 $s^{-1}$ was determined as the viscosity of the cathode slurry.

The cathode slurry was stirred in a ball mill at 80 rpm and stored for 24 hours, then a viscosity V2 was measured by the same method as described above.

A viscosity change rate was measured according to the following equation.

$$\text{Viscosity change rate (\%)}=(V2-V1)/V1\times100(\%)$$

(2) Preparation of Cathode

A cathode was prepared using the cathode slurry stored for 24 hours.

The cathode slurry was applied to a region of an aluminum foil (a cathode current collector with a thickness of 15 μm) having a protrusion part (cathode tab) on one side except for the protrusion part, followed by drying and rolling the same to prepare a cathode.

Evaluation 2: Evaluation of Amount of Residual Dispersion Medium (NMP) in Cathode Active Material Layer About 2 g of the cathode (including the cathode active material layer and the cathode current collector) was cut to obtain a cathode sample.

An amount of residual NMP in the cathode sample (i.e., an amount of residual NMP in the cathode active material layer) was calculated using a gas chromatography method.

(3) Manufacture of Lithium Secondary Battery

An anode slurry was prepared by dispersing an anode active material in which artificial graphite and natural graphite were mixed in a weight ratio of 7:3, styrene butadiene rubber (SBR) as a binder, and carboxymethyl cellulose (CMC) as a thickener in water in a weight ratio of 97:1:2 to prepare an anode slurry.

The anode slurry was applied to a region of a copper foil (an anode current collector with a thickness of 15 μm) having a protrusion part (anode tab) on one side except for the protrusion part, followed by drying and rolling the same to prepare an anode.

An electrode assembly was formed by interposing a polyethylene separation membrane (thickness: 20 μm) between the cathode and the anode. Next, a cathode lead and an anode lead were welded and connected to the cathode tab and the anode tab, respectively.

An electrolyte was prepared by preparing 1 M $LiPF_6$ solution (30:70 v/v EC/EMC mixed solvent), then adding the following components thereto, so as to be 1 wt. % of fluoroethylene carbonate (FEC), 0.3 wt. % of vinylethylene carbonate (VEC), 1 wt. % s of lithium difluorophosphate ($LiPO_2F_2$), 0.5 wt. % of 1,3-propane sultone (PS), and 0.5 wt. % of 1,3-propene sultone (PRS) based on the total weight of the electrolyte.

The electrode assembly was housed in a pouch (case) so that some regions of the cathode lead and the anode lead were exposed to an outside of the pouch, followed by sealing three sides of the pouch except for a side of an electrolyte injection part.

The electrolyte was injected into the pouch, followed by sealing the side of an electrolyte injection part to prepare a lithium secondary battery.

Evaluation 3: Evaluation of Internal Resistance (DC-IR)

The lithium secondary battery was subjected to 0.3C CC/CV charge (4.2 V 0.05C CUT-OFF) at 25° C., and then 0.3C CC discharge up to 50% point of state-of-charge (SOC).

At 50% point of SOC, the lithium secondary battery was discharged and supplementary charged for 10 seconds, while changing C-rate to 0.2C 0.5C, 1C, 1.5C, 2C, 2.5C and 3.0C, respectively.

When performing the discharge and supplementary charge, terminal points of the voltage were composed with an equation of a straight line and a slope thereof was adopted as the DCIR.

Examples 2 and 3, and Comparative Examples 1 to 5

Cathode and lithium secondary batteries were prepared by the same procedures as described in Example 1, except that the input amounts of maleic acid were changed as shown in Table 1 below when preparing the cathode slurry.

Evaluations 1 to 3 were carried out by the same procedures as described in Example 1.

TABLE 1

| | Input amount of MA (parts by weight) | Viscosity change rate (%) | Amount of residual NMP (ppm) | DC-IR (mΩ) |
|---|---|---|---|---|
| Example 1 | 0.01 | 85 | 53 | 1.335 |
| Example 2 | 0.03 | 61 | 105 | 1.340 |
| Example 3 | 0.05 | 67 | 340 | 1.348 |
| Comparative Example 1 | 0 | 108 | — | — |
| Comparative Example 2 | 0.07 | 65 | 523 | 1.368 |
| Comparative Example 3 | 0.1 | 68 | 972 | 1.380 |
| Comparative Example 4 | 0.15 | 63 | 590 | 1.390 |
| Comparative Example 5 | 0.2 | 64 | 536 | 1.395 |

Referring to Table 1 above, gelation of the cathode slurries of the examples and Comparative Examples 2 to 5 including maleic acid added thereto was suppressed over time.

On the other hand, the cathode slurry of Comparative Example 1 had a severe degree of gelation, thereby making it difficult to coat the cathode slurry and form the cathode active material layer.

The cathodes of the examples included maleic acid within a predetermined content range, such that the amount of NMP remaining in the cathode active material layer was smaller than that of the cathodes of Comparative Examples 2 to 5.

In addition, the lithium secondary batteries of the examples exhibited a lower DC-IR value than the lithium secondary batteries of Comparative Examples 2 to 5.

What is claimed is:

1. A cathode slurry for a lithium secondary battery comprising:
   - a cathode active material including lithium metal oxide particles;
   - a binder;
   - a dispersion medium; and
   - at least one multivalent carboxylic acid compound or at least one salt of the multivalent carboxylic acid compound;
   - wherein a total content of the at least one multivalent carboxylic acid compound or the at least one salt of the multivalent carboxylic acid compound is 0.01 to 0.05 parts by weight based on 100 parts by weight of the lithium metal oxide particles, and
   - wherein a content of the dispersion medium is 15 to 30% by weight based on a total weight of the cathode slurry.

2. The cathode slurry for a lithium secondary battery according to claim 1, wherein the multivalent carboxylic acid compound includes 2 to 5 carboxyl groups.

3. The cathode slurry for a lithium secondary battery according to claim 1, wherein the number of carbon atoms of the multivalent carboxylic acid compound is 3 to 20.

4. The cathode slurry for a lithium secondary battery according to claim 1, wherein the multivalent carboxylic acid compound is represented by Formula 1 below:

[Formula 1]

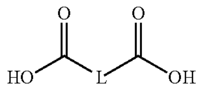

(In Formula 1, L represents a substituted or unsubstituted C1-C10 alkylene group, or a substituted or unsubstituted C2-C10 alkenylene group).

5. The cathode slurry for a lithium secondary battery according to claim 1, wherein the lithium metal oxide particles contain 80 mol % or more of nickel based on the total number of moles of all elements except for lithium and oxygen.

6. The cathode slurry for a lithium secondary battery according to claim 1, wherein the binder includes a fluorine binder resin.

7. The cathode slurry for a lithium secondary battery according to claim 6,
   - wherein a weight ratio of the fluorine binder resin to a total weight of the at least one multivalent carboxylic acid compound or the at least one salt of the multivalent carboxylic acid compound in the cathode slurry is 20 to 200.

8. The cathode slurry for a lithium secondary battery according to claim 1, wherein the dispersion medium includes a polar organic solvent.

9. A method of preparing a cathode slurry for a lithium secondary battery comprising:
   - mixing a cathode active material including lithium metal oxide particles, a binder, a dispersion medium, and a multivalent carboxylic acid compound, to prepare a cathode slurry; and
   - coating a cathode current collector with the cathode slurry, to form a cathode active material layer,
   - wherein the step of preparing the cathode slurry comprises mixing the lithium metal oxide particles and the multivalent carboxylic acid compound in a weight ratio of 100:0.01 to 100:0.05, and
   - wherein in the step of preparing the cathode slurry, the multivalent carboxylic acid compound is converted into a salt of the multivalent carboxylic acid compound.

10. The method of preparing a cathode for a lithium secondary battery according to claim 9, wherein the lithium metal oxide particles contain 80 mol % or more of nickel based on the total number of moles of all elements except for lithium and oxygen.

11. The method of preparing a cathode slurry for a lithium secondary battery according to claim 9, wherein the step of forming the cathode active material layer comprises drying the cathode active material layer so as to remove at least a portion of the dispersion medium, and
   - in the step of drying the cathode active material layer, an amount of the dispersion medium remaining in the cathode active material layer is adjusted to less than 400 ppm based on a total weight of the cathode active material layer.

12. A cathode for a lithium secondary battery comprising:
   - a cathode current collector; and
   - a cathode active material layer formed on the cathode current collector, wherein the cathode active material layer comprises:

a cathode active material including lithium metal oxide particles;

a binder; and at least one multivalent carboxylic acid compound or at least one salt of the multivalent carboxylic acid compound, wherein a total content of the at least one multivalent carboxylic acid compound and the at least one salt of the multivalent carboxylic acid compound in the cathode active material layer is 0.01 to 0.05 parts by weight based on 100 parts by weight of the lithium metal oxide particles, and wherein the cathode active material layer is formed from a cathode slurry comprising the cathode active material, the binder, the at least one multivalent carboxylic acid compound or the at least one salt of the multivalent carboxylic acid compound, and a dispersion medium, and an amount of the dispersion medium remaining in the cathode active material layer is less than 400 ppm based on a total weight of the cathode active material layer.

13. A lithium secondary battery comprising:

the cathode for a lithium secondary battery according to claim 12; and an anode disposed to face the cathode.

* * * * *